(12) United States Patent
Yoshie et al.

(10) Patent No.: US 7,139,681 B2
(45) Date of Patent: Nov. 21, 2006

(54) SYSTEM FOR DIAGNOSING FACILITY APPARATUS, MANAGING APPARATUS AND DIAGNOSTIC APPARATUS

(75) Inventors: Osamu Yoshie, 2-6-402, Hibikino, Kitakyushu-shi, Fukuoka 803-0135 (JP); Nobuyoshi Sato, Zama (JP); Tatsuya Fukunaga, Yokohama (JP)

(73) Assignees: Asahi Kasei Engineering Corporation, Osaka (JP); Osamu Yoshie, Fukuoka (JP)

( * ) Notice: Subject to any disclaimer, the term of this patent is extended or adjusted under 35 U.S.C. 154(b) by 0 days.

(21) Appl. No.: 11/330,266

(22) Filed: Jan. 12, 2006

(65) Prior Publication Data
US 2006/0129358 A1 Jun. 15, 2006

Related U.S. Application Data

(62) Division of application No. 10/332,007, filed as application No. PCT/JP01/05807 on Jul. 4, 2001.

(30) Foreign Application Priority Data

Jul. 4, 2000 (JP) .............................. 2001-201907
Aug. 31, 2000 (JP) .............................. 2000-262500

(51) Int. Cl.
G06F 19/00 (2006.01)

(52) U.S. Cl. ...................... 702/188; 702/182; 340/500; 340/635

(58) Field of Classification Search ..................... None
See application file for complete search history.

(56) References Cited

U.S. PATENT DOCUMENTS

| 5,311,562 | A | 5/1994 | Palusamy et al. |
| 5,533,413 | A | 7/1996 | Kobayashi et al. |
| 5,845,230 | A | 12/1998 | Lamberson |
| 5,963,884 | A | 10/1999 | Billington et al. |
| 6,041,287 | A | 3/2000 | Dister et al. |
| 6,192,325 | B1 | 2/2001 | Piety et al. |
| 6,199,018 | B1 | 3/2001 | Quist et al. |
| 6,298,308 | B1 | 10/2001 | Reid et al. |
| 6,411,678 | B1 | 6/2002 | Tomlinson et al. |
| 6,421,571 | B1 | 7/2002 | Spriggs et al. |
| 6,489,884 | B1 * | 12/2002 | Lamberson et al. ......... 340/7.2 |
| 6,505,145 | B1 * | 1/2003 | Bjornson .................... 702/185 |
| 6,556,956 | B1 * | 4/2003 | Hunt .......................... 702/188 |
| 6,587,812 | B1 | 7/2003 | Takayama |
| 6,594,621 | B1 | 7/2003 | Meeker |
| 6,604,061 | B1 | 8/2003 | Takahashi et al. |
| 6,618,692 | B1 * | 9/2003 | Takahashi et al. .......... 702/188 |
| 6,795,798 | B1 | 9/2004 | Eryurek et al. |
| 6,795,799 | B1 * | 9/2004 | Deb et al. ................... 702/188 |
| 6,813,532 | B1 | 11/2004 | Eryurek et al. |
| 6,853,959 | B1 * | 2/2005 | Ikeda et al. ................. 702/188 |
| 6,925,338 | B1 | 8/2005 | Eryurek et al. |
| 6,963,817 | B1 | 11/2005 | Ito et al. |
| 6,999,903 | B1 * | 2/2006 | Ikeda et al. ................. 702/188 |
| 2001/0001851 | A1 | 5/2001 | Piety et al. |
| 2001/0056335 | A1 * | 12/2001 | Ikeda et al. ................. 702/188 |
| 2002/0013635 | A1 | 1/2002 | Gotou et al. |
| 2002/0022969 | A1 | 2/2002 | Berg et al. |
| 2002/0035447 | A1 * | 3/2002 | Takahashi et al. .......... 702/188 |
| 2002/0052715 | A1 | 5/2002 | Maki |
| 2002/0116157 | A1 * | 8/2002 | Markle et al. .............. 702/188 |
| 2002/0123864 | A1 * | 9/2002 | Eryurek et al. ............. 702/188 |
| 2002/0161555 | A1 * | 10/2002 | Deb et al. ................... 702/188 |
| 2002/0169514 | A1 * | 11/2002 | Eryurek et al. ............. 700/110 |
| 2002/0177978 | A1 * | 11/2002 | Obenhoff et al. ........... 702/188 |
| 2003/0004656 | A1 * | 1/2003 | Bjornson .................... 702/34 |
| 2004/0133397 | A1 * | 7/2004 | Bjornson .................... 702/185 |
| 2005/0021311 | A1 * | 1/2005 | Deb et al. ................... 702/188 |
| 2005/0131656 | A1 * | 6/2005 | Ikeda et al. ................. 702/188 |

FOREIGN PATENT DOCUMENTS

| EP | 0 436 312 A2 | 7/1991 |
| EP | 0 822 473 A2 | 2/1998 |
| JP | 02-62606 A | 3/1990 |
| JP | 5-011834 | 1/1993 |
| JP | 05-011834 A | 1/1993 |
| JP | 08-137540 A | 5/1996 |
| JP | 10-222220 A | 8/1998 |
| JP | 11-119815 A | 4/1999 |
| JP | 11-252670 A | 9/1999 |

| WO | WO 00/62138 | * 10/2000 |

OTHER PUBLICATIONS

J. Kinoshita, "System For Diagnosing CNC," WO 90/002366 A, (Abstract only- 1 sheet), Mar. 8, 1990.

* cited by examiner

*Primary Examiner*—Patrick J. Assouad
(74) *Attorney, Agent, or Firm*—Finnegan, Henderson, Farabow, Garrett & Dunner, L.L.P.

(57) ABSTRACT

The present invention relates to a system for managing and diagnosing a state of a facility apparatus, and an object thereof is to provide a system for diagnosing the facility apparatus wherein, if information falling under a level of abnormality is extracted from gathered information on an operating state of the facility apparatus, an advanced analysis and diagnosis section on a facility diagnosis center side performs an advanced analysis and diagnosis process and promptly notifies a user side of the information on the best way of dealing with the facility apparatus determined to be abnormal, and further uploads a facility management data analysis program from the advanced analysis and diagnosis section to a facility monitoring section on the user side so that raw information of a large information amount can be analyzed on the user side without sending it to the facility diagnosis center side.

A facility management data processing section (3*a*) signal-processes facility state detecting information detected by facility state detectors (2*a*, 2*b*) mounted on a facility apparatus (1), a facility state determining section (4) determines a level of the signal-processed information comparing with a management reference value and outputs it, the facility monitoring section (5) gathers and processes the information related to the level-determined facility apparatus (1) and sends it to the advanced analysis and diagnosis section (6) via a communication network (10), and the advanced analysis and diagnosis section (6) performs an advanced analysis of the information and identifies a cause of the abnormality of the facility apparatus (1) concerned and improvement measures thereof to send the identified results to the facility monitoring section (5). In addition, it is characterized in that the facility management data analysis program is uploaded from the advanced analysis and diagnosis section (6) to the facility monitoring section (5) so that the advanced analysis can be performed on the user side B.

6 Claims, 15 Drawing Sheets

FIG. 10

Diagnostic result notice

Diagnostic results

| | Name | Measurement point | Measurement Mode | Measured value | Unit | Determination 8c | Diagnostic result 8a Primary | 8b Secondary |
|---|---|---|---|---|---|---|---|---|
| 1 | B extruder proper | ①-v | Acceleration | 0.21 | g | △ | ☑ | ☐ |
| 2 | B extruder double-reduction gearing | ③-v | Speed | 8.10 | mm/s | × | ☑ | ☐ |
| 3 | | | Acceleration | 0.28 | g | △ | ☑ | ☐ |
| 4 | | ④-v | Speed | 9.80 | mm/s | × | ☑ | ☐ |
| 5 | | | Acceleration | 0.48 | g | △ | ☑ | ☐ |
| 6 | | ⑤-v | Speed | 7.80 | mm/s | × | ☑ | ☐ |
| 7 | | | Acceleration | 0.37 | g | △ | ☑ | ☐ |
| 8 | | ⑥-v | Speed | 6.60 | mm/s | △ | ☑ | ☐ |
| 9 | | | Acceleration | 0.35 | g | △ | ☑ | ☐ |

FIG. 11

[Primary diagnostic results]

[Cause of vibration]
It is caused by considerable progress of the abrasion of one-step engagement gears.
The tooth surface may have damage such as scoring, pitting and spalling.

[Countermeasures]
Stop the facility as early as possible to inspect the gears. Select appropriate countermeasures and take action based on tooth bearing situation and damage forms of the tooth surfaces as a result of the inspection.
For instance, the damage forms of the gears are classified into three types of (1)deep scoring, (2)pitting and (3)spalling.

As for the countermeasures comparing with the damage forms of the tooth surfaces, perform the following.
(1)Deep scoring
It has progressed due to delay in the countermeasures comparing with light scoring, and its speed of progress will be slow by adopting extreme pressure lubricating oil.
(2)Pitting
In the case of early-stage pitting, the pitting will disappear as the tooth surface fits in.
In the case of progressive pitting, however, the cause is lack of fatigue strength of the metallic material, and so advice of the manufacturer should be sought immediately. Its speed of progress will be slow by adopting highly refined oil.
(3)Spalling
The progress cannot be stopped since it is a phenomenon occurring due to metallic fatigue caused by extensive surfacing because of high load. Its speed of progress will be slow by adopting highly refined oil. Advice of the manufacturer should be sought because there are also the cases of a failure of the material and imperfect heat treatment.

FIG. 12

[Secondary diagnostic results]

Abnormality of a slot portion of a motor rotor or a stator (loosened wedge, etc.)'

[Instructions]
(1) Release a coupling, a V belt and so on, and measure the vibration in individual operation of the motor.
(2) Monitor the change in vibration successively when the moter is stopped.

[Determination]
If the vibration value is abnormal even in the case of the individual operation of the motor, and as for the change in vibration when the motor is stopped, if the vibration value abruptly lowers on turning off the switch, the cause of the vibration is the 'abnormality of the slot portion of the motor rotor or the stator.'

*FIG.13*

| Question number | | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|
| | | | Air blower proper | | | | | | | | | | | | | |
| | | | Impeller | | | | | | Rotor axis | | | | Bearing | | | |
| | | | Imbalance due to a defective prototype | Imbalance due to a bend of a heated rotor | Imbalance due to adhesion/disorption of dust | Imbalance due to corrosion/abrasion | Imbalance due to crack/breakage | Clearance/looseness with the axis | Contact with casing | Bend of an axis | Resonance | Contact with an axis rail | Crack | Outer ring flaw | Inner ring flaw | Rolling element flaw |
| 1 | Occurrence stage | New or immediately after remodeling | ● | ● | | | | | ● | ● | ● | ● | | | | |
| 2 | | Immediately after bearing replacement | | | | | | | | | | ● | | | | |
| 3 | | Immediately after changing oil or lubrication | | | | | | | | | | | | | | |
| 4 | | Immediately after balancing | | | | | | | | | | ● | | | | |
| 5 | | After elapse of a certain length of time | | | ● | ● | ● | ● | | | | | ● | ● | ● | ● |
| 6 | Abnormal point | Motor opposite-load side | | | | | | | | | | | | | | |
| 7 | | Motor load side | | | | | | | | | | | | | | |
| 8 | | Body drive side | ● | ● | ● | ● | ● | ● | ● | ● | ● | ● | ● | ● | ● | ● |
| 9 | | Body opposite-drive side | ● | ● | ● | ● | ● | ● | ● | ● | ● | ● | ● | ● | ● | ● |
| 10 | Abnormal mode | Speed O/A value | ● | ● | ● | ● | ● | ● | ● | ● | ● | ● | ● | | | |
| 11 | | Acceleration O/A value | | | | | | | | | | | | ● | ● | ● |
| 12 | | Acceleration wave height rate | | | | | | | | | | | | ● | ● | ● |
| 13 | | Corroded portion | | | | ● | | | | | | | | | | |
| 14 | | | | | | | | | | | | | | | | |

SYSTEM FOR DIAGNOSING FACILITY APPARATUS, MANAGING APPARATUS AND DIAGNOSTIC APPARATUS

This application is a divisional of U.S. application Ser. No. 10/332,007 filed Jan. 3, 2003, which is a §371 of International Application No. PCT/JP01/05807 filed Jul. 4, 2001, the contents of both of which are incorporated herein by reference.

TECHNICAL FIELD

The present invention relates to a system for managing and diagnosing a state of a facility apparatus.

BACKGROUND ART

In the past, as for management of a facility apparatus of a plant and so on of a common enterprise, it was general that, while constantly watching operating situation of the facility apparatus, a person in charge of managing the facility apparatus further monitored a state of the facility apparatus at the site when an abnormality occurs as to vibration, sound, pressure, temperature and so on thereof, and stopped its operation, as the case may be, to investigate the cause and urgently repair it or replace a part, or to refer it to a facility apparatus manufacturer and consider countermeasures comparing with it when the situation further became serious.

In the aforementioned example in the past, however, a judgment was made based on personal knowledge and experience to the extent that the person in charge of managing the facility apparatus can deal with it, so that the judgment result was not necessarily correct and there were the cases, according to circumstances, where a wrong judgment was made and the judgment result lacked objectivity.

On the other hand, it has been increasingly demanded in recent years to reduce total costs of the plant, for the sake of safe operation and improvement in productivity thereof, by means of improved accuracy of facility management, increased efficiency of technically trained personnel for the facility management, and improved reliability of the facility apparatus. In addition, it is becoming a common understanding that predictive diagnosises and steady maintenance planning should be thoroughly performed for various facility apparatuses, particularly for key apparatuses.

For instance, as for the plant in which a large number of rotating apparatuses and so on are placed, the person in charge of managing the facility apparatus periodically performs maintenance work while performing daily operating work. However, it requires expertise in its own way to solve problems related to predictive maintenance such as facility diagnosis, predictive diagnosis and optimum operating conditions of the rotating apparatuses or a grasp of remaining life thereof, and so there is a limit to what can be done only by the person in charge of managing the facility apparatus.

Therefore, it is desirable to have the technically trained personnel with such expertise stationed in the plant, and yet it is difficult in many cases in consideration of the cost aspect of the plant operation such as the increased efficiency of the personnel.

The present invention solves the above described problem, and an object thereof is to provide a system for diagnosing the facility apparatus, wherein minimum operating situation of the facility apparatus is grasped and controlled by constantly measuring it with a device or manually to gather various kinds of data, and if information falling under a level of abnormality is extracted from the gathered information, the information is promptly sent to a facility diagnosis center which is a specialized technological group, where an advanced analysis and diagnosis section performs an advanced analysis and diagnosis process to the information and promptly notifies the facility apparatus management side of the information on the best way of dealing with the facility apparatus determined to be abnormal, and uploads a facility management data analysis program from the advanced analysis and diagnosis section to a facility monitoring section on the user side in the case where it is necessary to further analyze various kinds of detailed on-site data, so that raw information of a large information amount can be analyzed on the user side without sending it to the facility diagnosis center side.

DISCLOSURE OF THE INVENTION

A representative configuration of a system for diagnosing a facility apparatus related to the present invention has facility state detecting means mounted on the facility apparatus for detecting a state of the facility apparatus, a facility management data processing section for signal-processing and outputting facility state detecting information detected by the above described facility state detecting means, a facility state determining section for determining a level of the information outputted from the above described facility management data processing section comparing with a management reference value and outputting it, a facility monitoring section for gathering, processing and outputting information related to the facility apparatus level-determined and outputted from the above described facility state determining section, and an advanced analysis and diagnosis section for performing an advanced analysis of the information outputted from the above described facility monitoring section and identifying a cause of an abnormality of the facility apparatus and improvement measures thereof to send the identified results to the above described facility monitoring section.

Furthermore, it has the configuration wherein the above described facility monitoring section and the above described advanced analysis and diagnosis section are capable of mutual communication via a communication network, and a facility management data analysis program is uploaded from the above described advanced analysis and diagnosis section to the above described facility monitoring section.

As the present invention is constituted as described above, facility state detecting information detected by the facility state detecting means is signal-processed by the facility management data processing section on the user side managing the facility apparatus, and thereafter, the level is determined comparing with the management reference value by the facility state determining section, and the information related to the level-determined facility apparatus from the facility monitoring section is gathered and processed so as to be outputted to a facility diagnosis center which is a specialized technological group via a communication network.

On the facility diagnosis center side, the advanced analysis and diagnosis section having received the information outputted from the facility monitoring section on the user side performs the advanced analysis of the information to identify a cause of an abnormality of the facility apparatus and improvement measures thereof so as to send the identified results to the facility monitoring section on the user side via the communication network. Thus, it is possible, on the user side managing the facility apparatus, to promptly acquire the information on the best way of dealing with the facility apparatus determined to be abnormal so as to handle it.

In this case, if the advanced analysis and diagnosis section determines that accuracy of the diagnosis can be rendered higher by further performing another advanced analysis, the facility management data analysis program is further uploaded as a secondary process from the advanced analysis and diagnosis section on the facility diagnosis center side to the facility monitoring section on the user side via the communication network so that the advanced analysis is performed again on the user side.

As the facility management data analysis program is uploaded to the user side and the advanced analysis is performed again on the user side, only a small information amount solely on analysis results is sent to the facility diagnosis center side without necessity to send raw data of an enormous information amount such as the facility state detecting information detected by the facility state detecting means to the facility diagnosis center side, and so a burden of information transfer on the communication network is alleviated.

In addition, security of the information is improved because the raw data is not exchanged on the communication network.

BRIEF DESCRIPTION OF THE DRAWINGS

FIG. 10 is a diagram showing an example of a diagnostic result list sent from the advanced analysis and diagnosis section.

FIG. 11 is a diagram showing an example of primary diagnostic results sent from the advanced analysis and diagnosis section.

FIG. 12 is a diagram showing an example of secondary diagnostic results sent from the advanced analysis and diagnosis section.

FIG. 13 is a diagram showing a relationship between the cause and results diagnosed by the advanced analysis and diagnosis section.

BEST MODE FOR CARRYING OUT THE INVENTION

Figure 1:
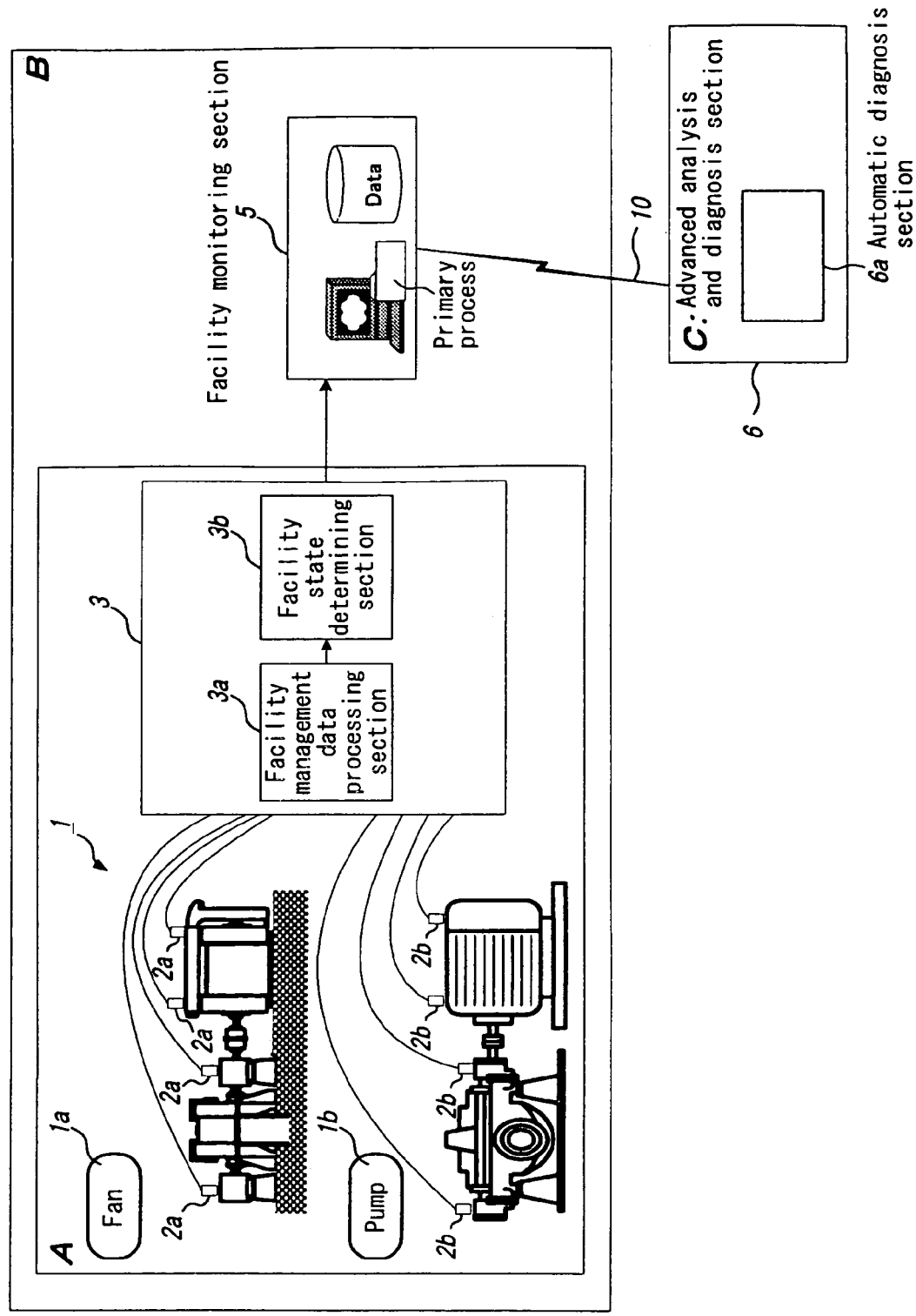
FIG. 1 is a block diagram showing a configuration of a system for diagnosing a facility apparatus related to the present invention.
Figure 2:
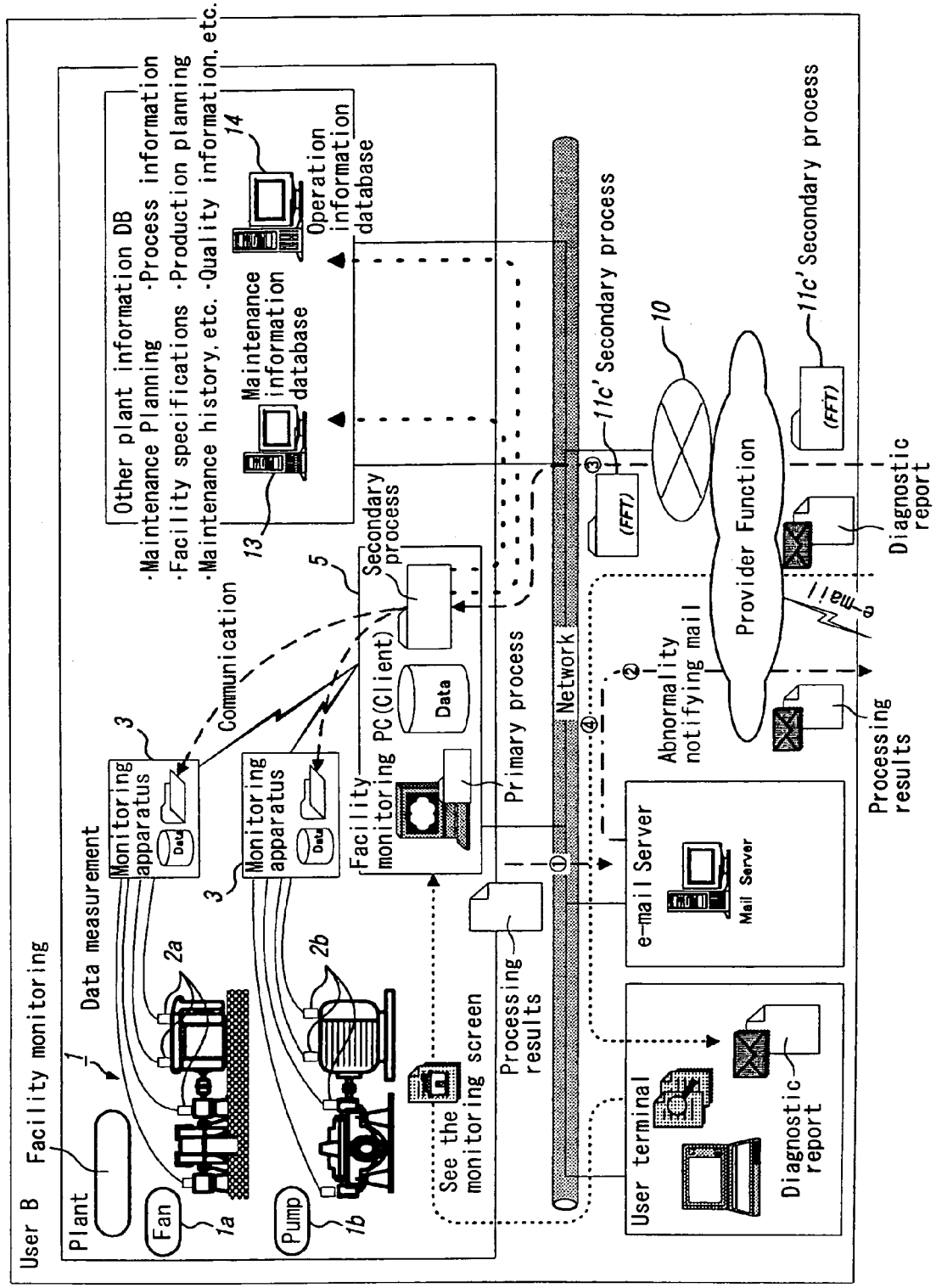
FIG. 2 is a block diagram showing a user-side configuration of the system for diagnosing the facility apparatus related to the present invention.
Figure 3:
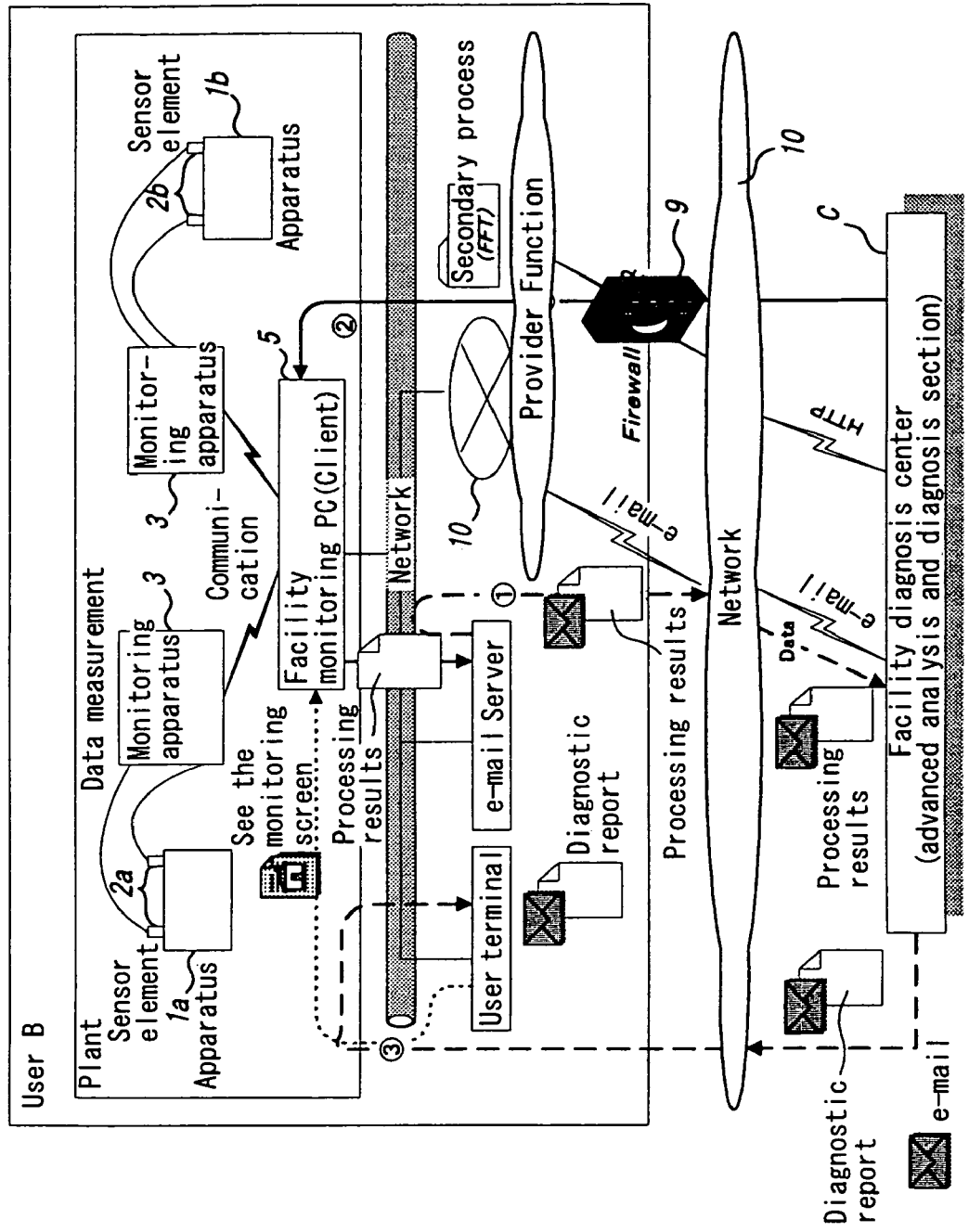
FIG. 3 is a diagram showing a configuration example of a communication network between a facility monitoring section and an advanced analysis and diagnosis section.
Figure 4:
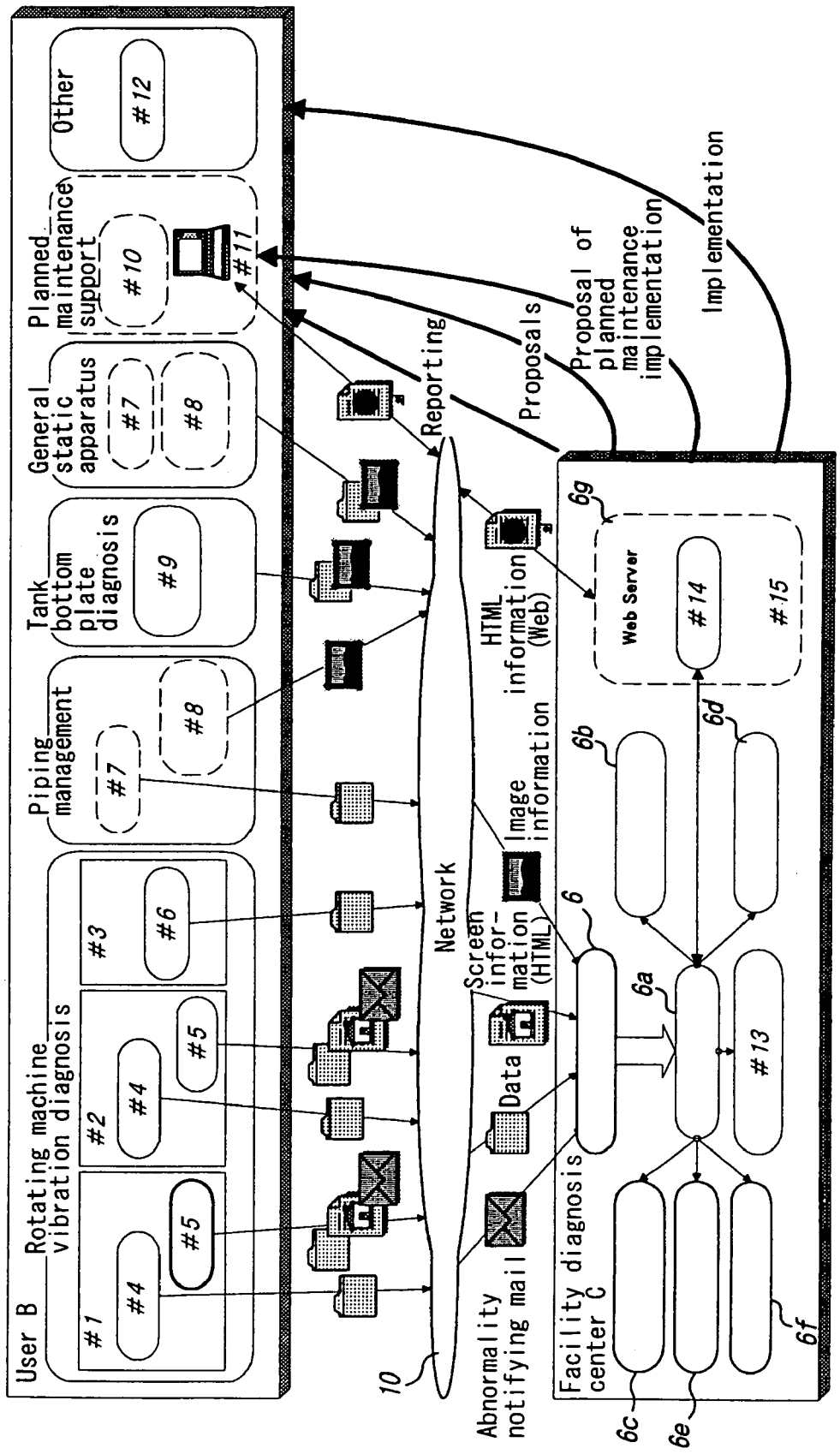
FIG. 4 is a block diagram showing the configurations of facility state detecting means and the advanced analysis and diagnosis section.
Figure 5:
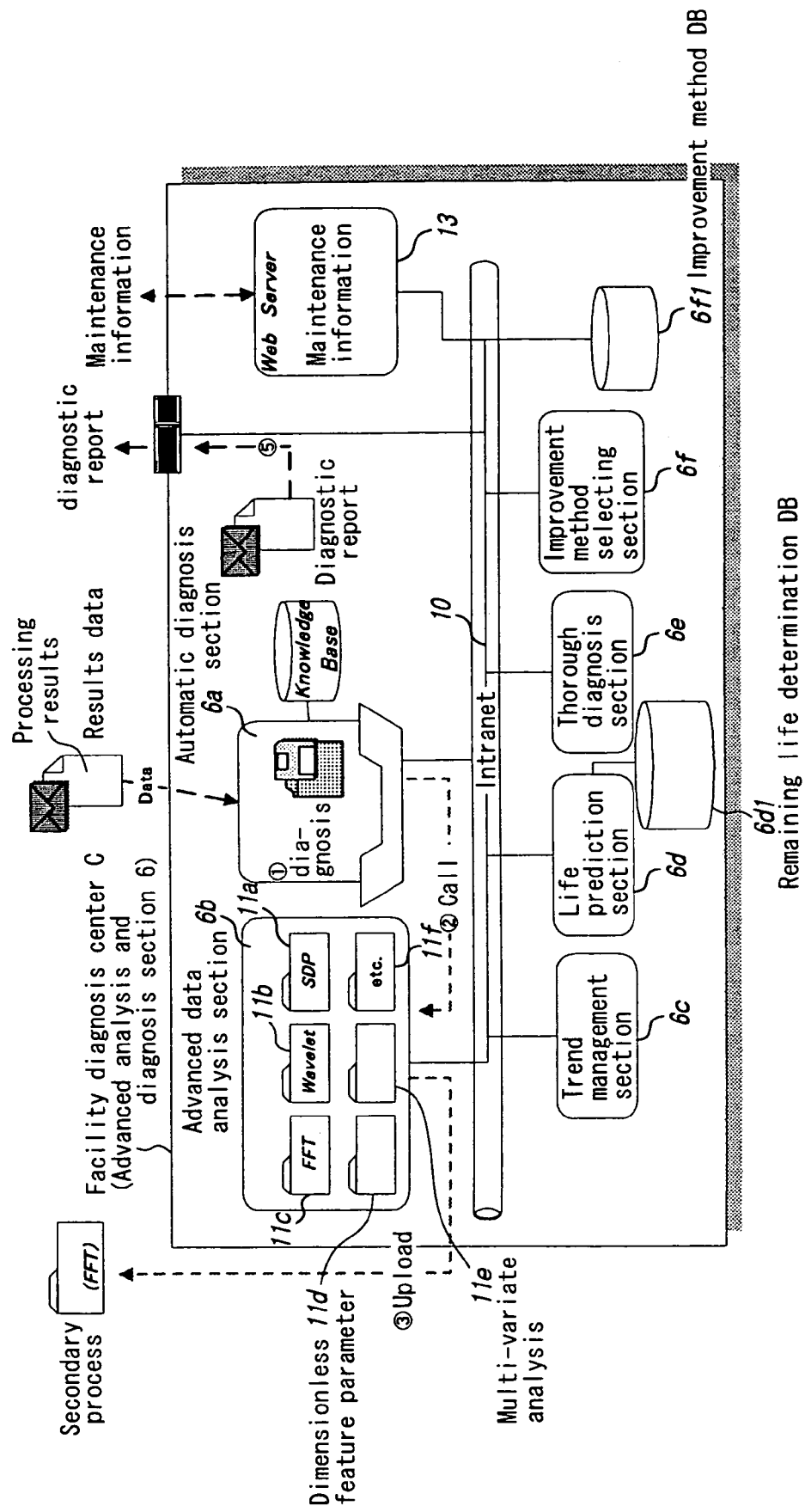
FIG. 5 is a block diagram showing the configuration of the advanced analysis and diagnosis section.
Figure 6:
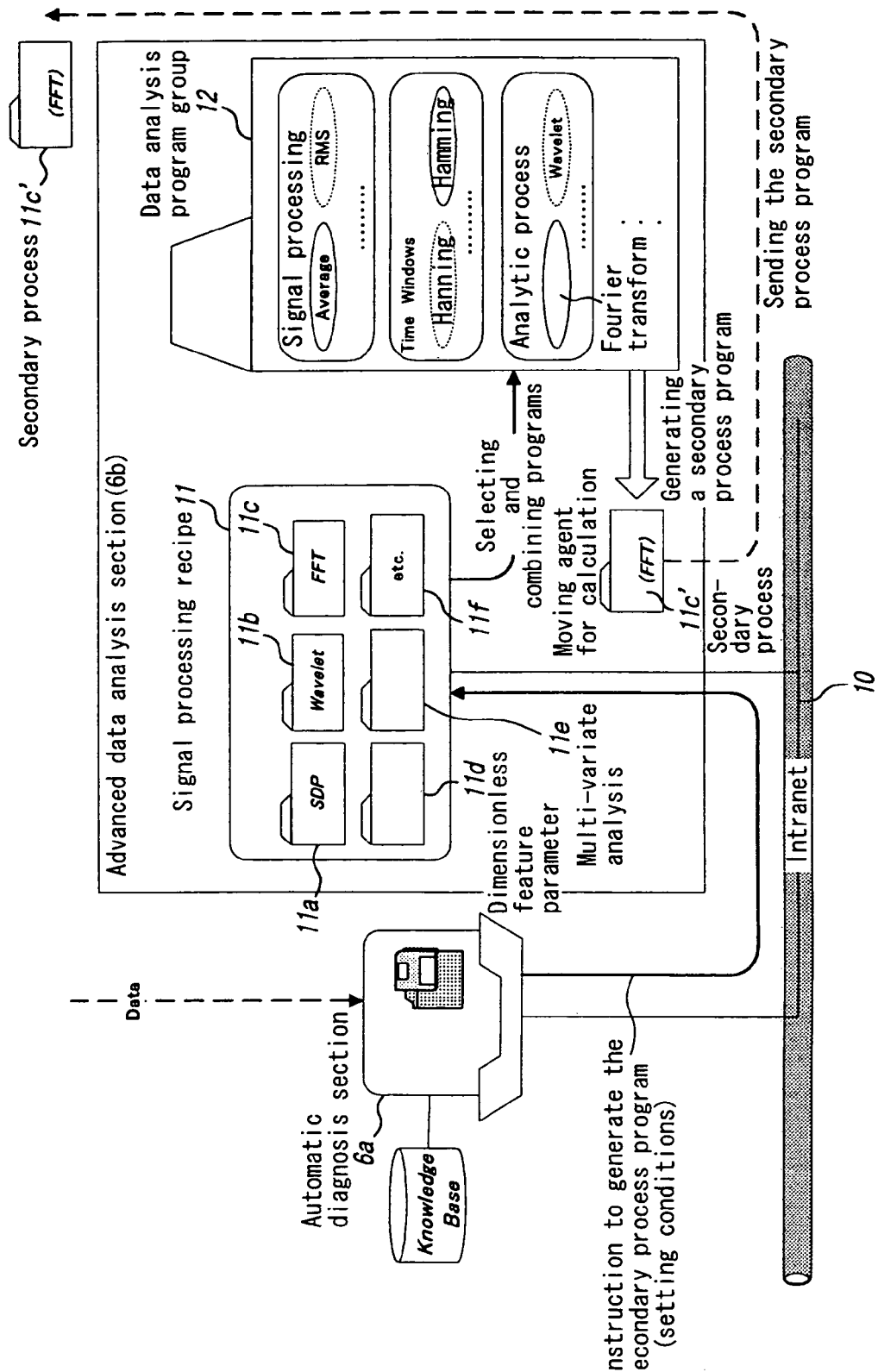
FIG. 6 is a diagram showing a detailed configuration of an advanced data analysis section.
Figure 7:
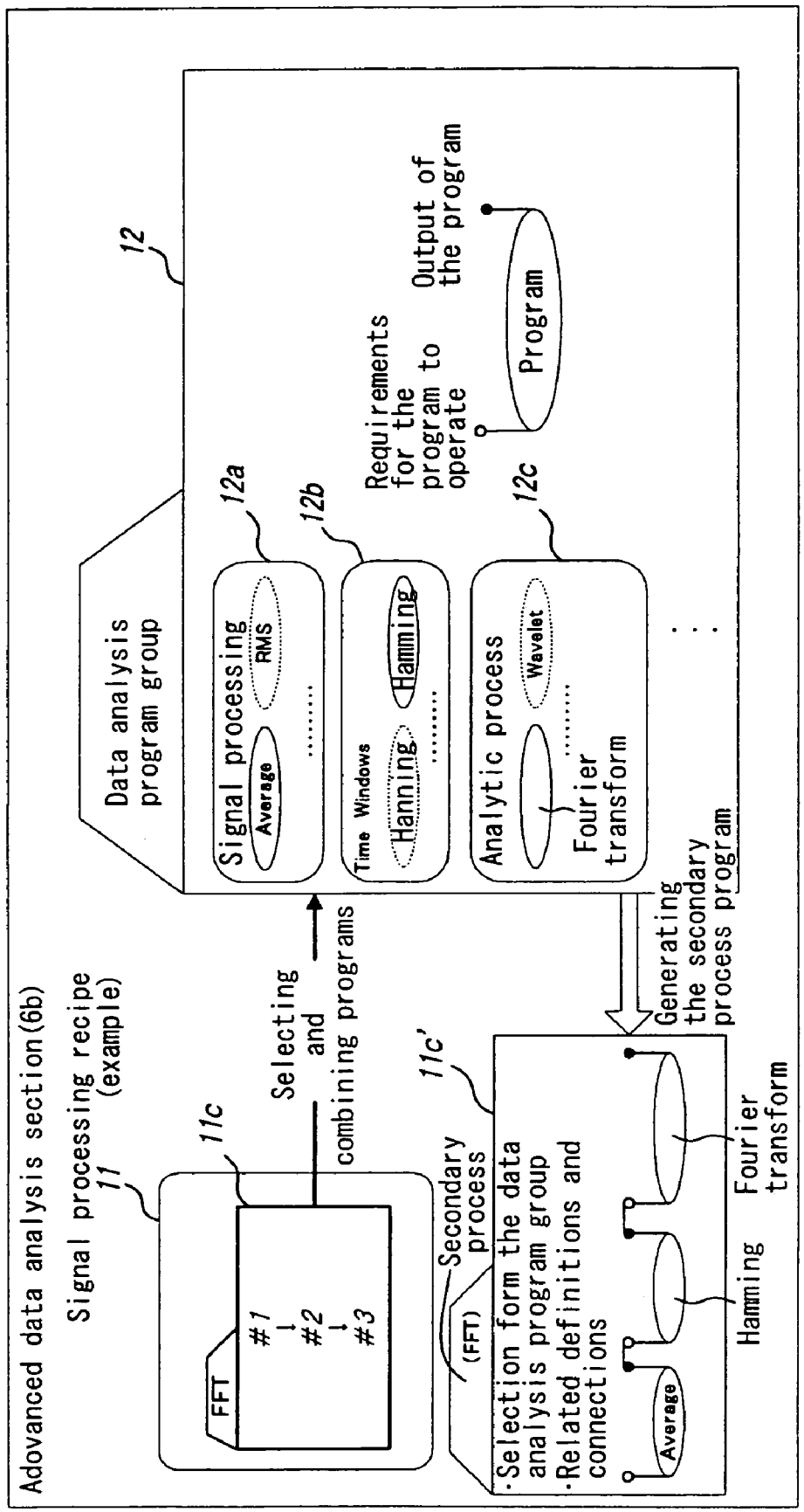
FIG. 7 is a diagram for explaining a relationship between a signal processing recipe and a facility management data analysis program group.

Next, an embodiment of a system for diagnosing a facility apparatus related to the present invention will be concretely described by using the drawings. FIG. 1 is a block diagram showing a configuration of the system for diagnosing the facility apparatus related to the present invention, FIG. 2 is a block diagram showing a user-side configuration of the system for diagnosing the facility apparatus related to the present invention, FIG. 3 is a diagram showing a configuration example of a communication network between a facility monitoring section and an advanced analysis and diagnosis section, FIG. 4 is a block diagram showing the configurations of facility state detecting means and the advanced analysis and diagnosis section, FIG. 5 is a block diagram showing the configuration of the advanced analysis and diagnosis section, FIG. 6 is a diagram showing a detailed configuration of an advanced data analysis section, and FIG. 7 is a diagram for explaining a relationship between a signal processing recipe and a facility management data analysis program group.

Figure 8:
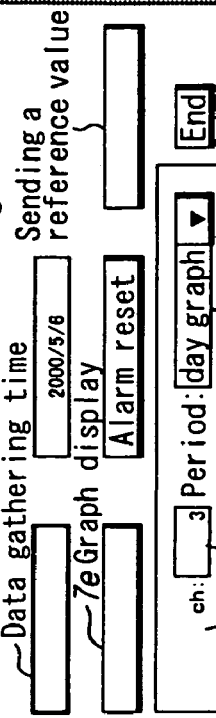
FIG. 8 is a diagram showing an example of a display screen image of the facility monitoring section.
Figure 9:
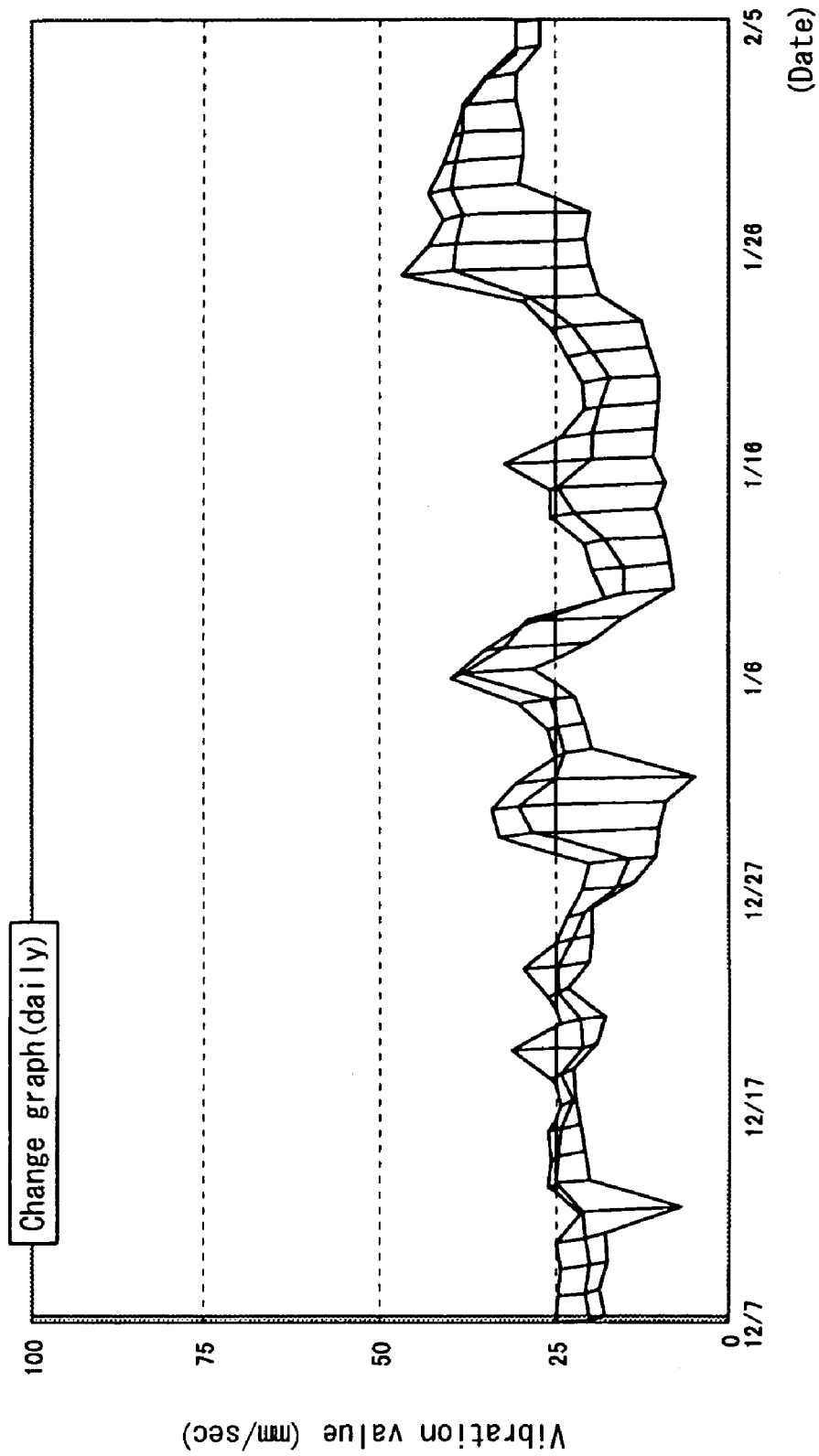
FIG. 9 is a diagram showing an example of the display screen image of the facility monitoring section.
Figure 14:
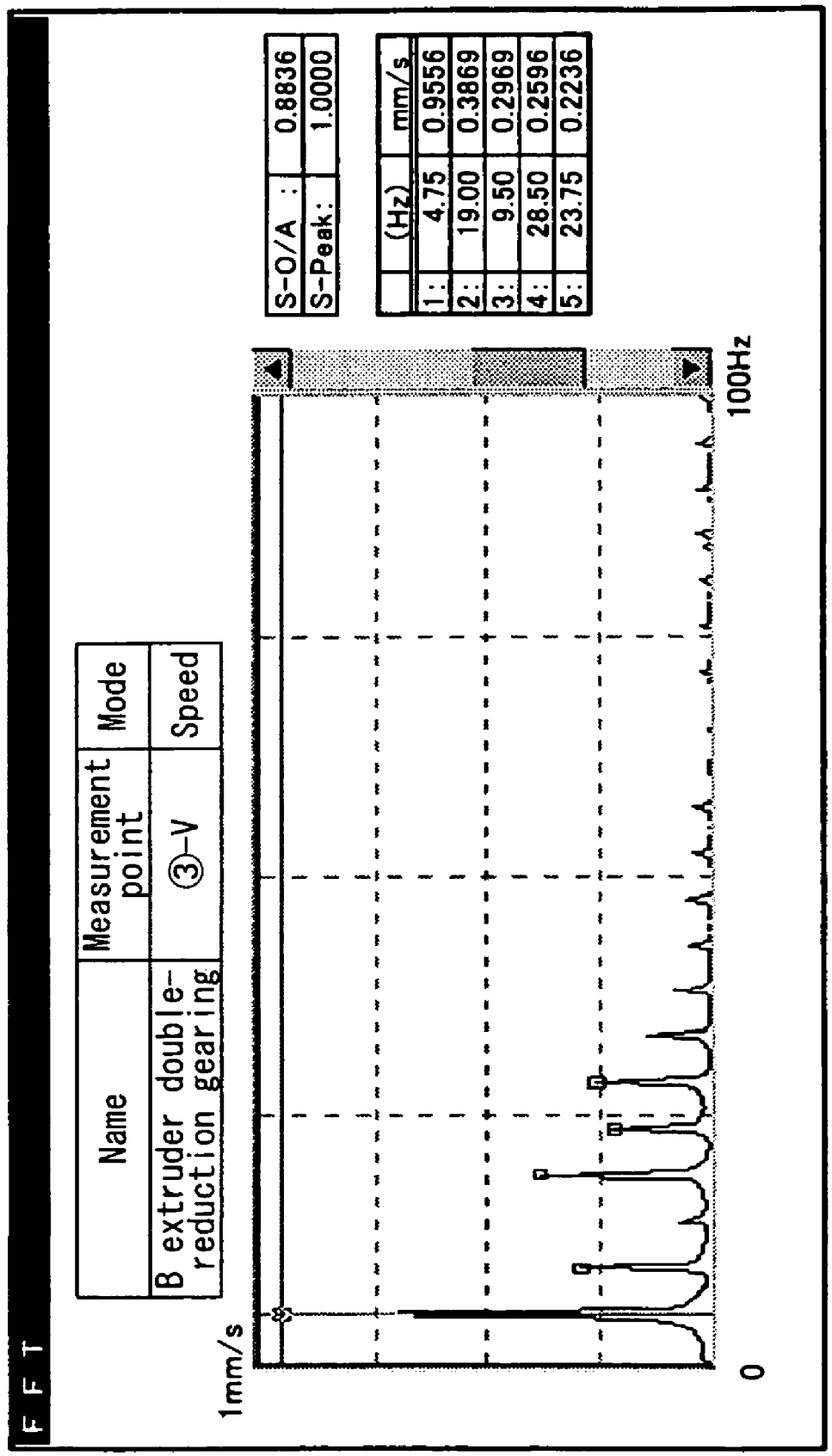
FIG. 14 is a diagram showing an example of output undergone a secondary process by using the facility management data analysis program uploaded on the user side.
Figure 15:
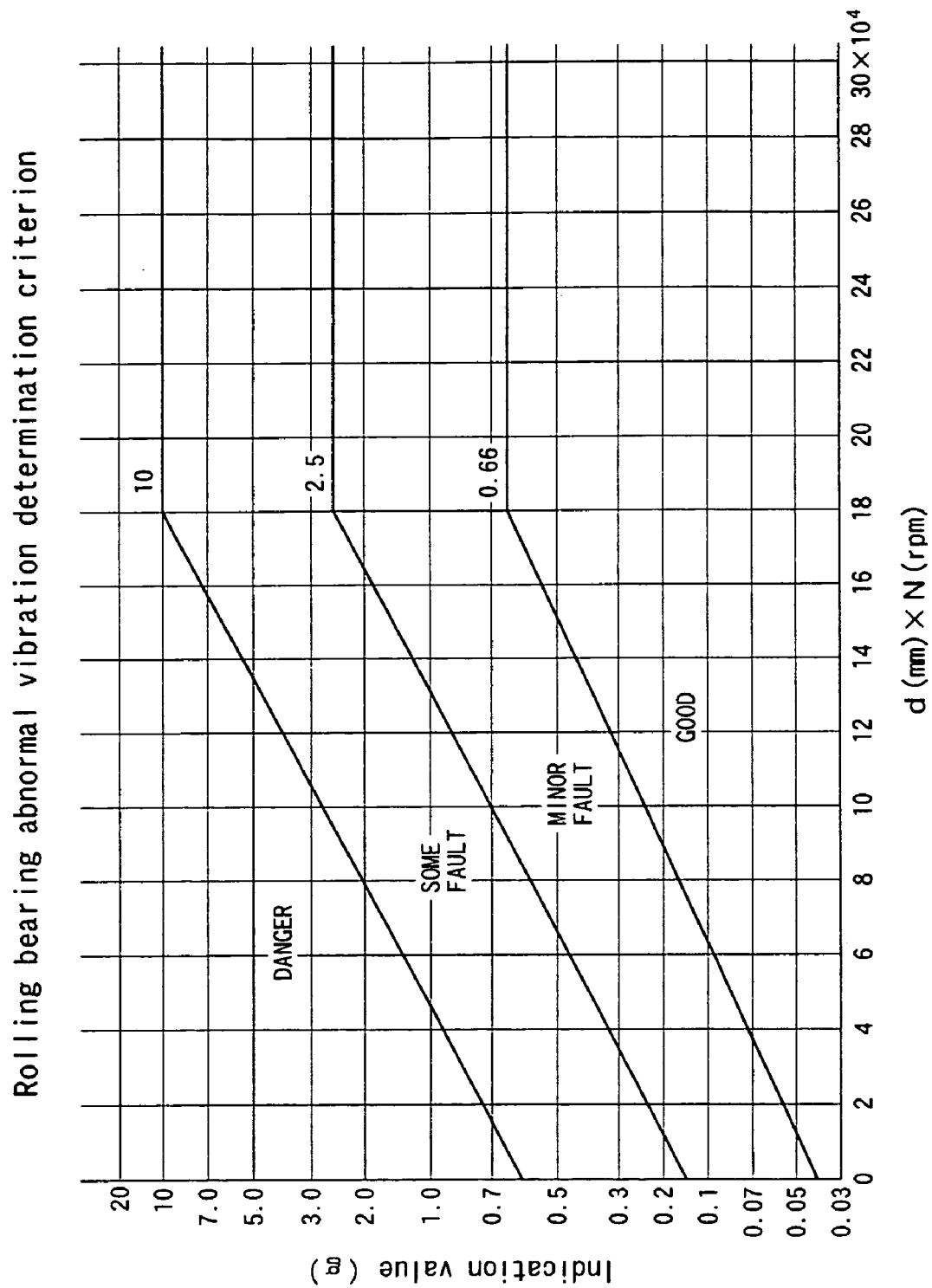
FIG. 15 is a diagram showing an example of a rolling bearing abnormal vibration determination criterion.

In addition, FIGS. 8 and 9 are diagrams showing examples of display screen images of the facility monitoring section, FIG. 10 is a diagram showing an example of a diagnostic result list sent from the advanced analysis and diagnosis section, FIG. 11 is a diagram showing an example of primary diagnostic results sent from the advanced analysis and diagnosis section, FIG. 12 is a diagram showing an example of secondary diagnostic results sent from the advanced analysis and diagnosis section, FIG. 13 is a diagram showing a relationship between the cause and results diagnosed by the advanced analysis and diagnosis section, FIG. 14 is a diagram showing an example of output having undergone a secondary process by using the facility management data analysis program uploaded on the user side, and FIG. 15 is a diagram showing an example of a rolling bearing abnormal vibration determination criterion.

In FIGS. 1 to 7, reference symbol A denotes a plant or the like on a user side B in which a large number of facility apparatuses such as rotating apparatuses are placed, and C denotes a facility diagnosis center side having a specialized technological group knowledgeable about diagnostic operation of the facility apparatuses, located at a distant place from the user side B.

The plant A has a large number of facility apparatuses for delivering various functions such as rotating apparatuses including a fan 1a and a pump 1b, where various facility apparatuses 1 have facility state detectors 2a and 2b comprised of various sensor elements and so on which are facility state detecting means for detecting the state of the facility apparatuses 1 mounted thereon.

The facility state detectors 2a and 2b send daily facility state detecting information on the facility apparatuses 1 to a facility management data processing section 3a of a monitoring apparatus 3, and the facility state information signal-processed by the facility management data processing section 3a is sent to a facility state determining section 3b.

The facility state determining section 3b determines a level of the information outputted from the facility management data processing section 3a comparing with a preset management reference value and outputs it. The facility management data processing section 3a and the facility state determining section 3b are placed at the site around the facility apparatuses 1 in the plant A.

For instance, vibration raw waveform data is collected by the facility state detectors 2a and 2b such as vibration sensors provided to the facility apparatuses 1, and the vibration raw waveform data undergoes signal processes such as a filter process, an integration process, an averaging process and a peak detection process in the facility management data processing section 3a, so that the facility state determining section 3b compares to preset thresholds the values of facility state parameters such as an O/A value (output of the averaging process) and a peak value representing the state of the facility apparatuses 1 obtained as a result of the signal processes so as to make a primary determination of the state of the facility apparatuses 1.

The information determined by the facility state determining section 3b is sent to a facility monitoring section 5 for centrally managing the facility apparatuses 1 of the entire plant A, and the facility monitoring section 5 gathers, processes, outputs and stores the information related to the facility apparatuses 1 level-determined and outputted from the facility state determining section 3b. To be more specific, the facility monitoring section 5 stores the facility state parameters as trend management data, and also gathers and manages facility-related information such as specifications and history of the facility apparatuses 1.

The facility monitoring section 5 on the user side B and an advanced analysis and diagnosis section 6 on a facility diagnosis center side C are constituted to be capable of mutual communication via a communication network 10 such as a network, the Internet or a public circuit, and the facility monitoring section 5 gathers and processes the information on the facility apparatus 1 determined to be abnormal by the facility state determining section 3b and sends it to the facility diagnosis center side C via the communication network 10.

To be more specific, in the case of being determined to be abnormal by the facility state determining section 3b, it sends the values of the facility state parameters which are primary process results as well as the facility-related information such as the trend management data gathered and managed by the facility monitoring section 5, specifications and history of the facility apparatus 1 to the facility diagnosis center side C via the communication network 10.

The information sent from the facility monitoring section 5 on the user side B is received by the advanced analysis and diagnosis section 6 on the facility diagnosis center side C, and the advanced analysis and diagnosis section 6 identifies a cause of an abnormality of the facility apparatus and improvement measures thereof by automatically analyzing the information outputted from the facility monitoring section 5 to send the identified results to the facility monitoring section 5.

As shown in FIG. 4, the advanced analysis and diagnosis section 6 has an automatic diagnosis section 6a provided thereto for evaluating diagnostic information sent from the user side B and automatically diagnosing an abnormal part, the cause of an abnormality, remaining life, countermeasures (improvement method) and so on.

In addition, as shown in FIGS. 5 and 6, the advanced analysis and diagnosis section 6 has an advanced data analysis section 6b for sending to the facility monitoring section 5 on the user side B the program for advanced data analyses such as an analysis by a time-frequency analysis technology for arbitrarily decomposing a raw waveform signal detected by the facility state detectors 2a and 2b into wavelets, and furthermore, an SDP (Symmetrized Dot Patterns) analysis by a visibility analysis technology of plotting the raw waveform signal detected by the facility state detectors 2a and 2b on a subject coordinate, and furthermore, a dimensionless feature parameter which is a signal processing technology for characterizing a characteristic of a signal and so on by rendering a dimensional characteristic amount such as vibration and sound dimensionless and thereby detecting the abnormality, and furthermore, a multivariate analysis which is an analysis technology for pursuing the cause by using a plurality of mutually correlated signals so as to have a detailed analysis performed, improve accuracy of abnormality detection and send the analysis results to the automatic diagnosis section 6a.

In addition, the advanced data analysis section 6b has the aforementioned signal processing recipes of an SDP file 11a, a wavelet file 11b, an FFT file 11c, a dimensionless feature parameter file 11d, a multi-variate analysis file 11e and another analysis file 11f provided thereto, and performs diagnosis at the advanced analysis and diagnosis section 6 based on the information outputted from the facility monitoring section 5, and in the case where it is necessary to perform additional diagnosis, it extracts a predetermined facility management data analysis program from a facility management data analysis program group 12 shown in FIGS. 6 and 7 so as to render it as an electronic file in the SDP file 11a, wavelet file 11b, FFT file 11c, dimensionless feature parameter file 11d, multi-variate analysis file 11e and another analysis file 11f of each signal processing recipe and upload them from the advanced analysis and diagnosis section 6 on the facility diagnosis center side C to the facility monitoring section 5 on the user side B.

In addition, as shown in FIGS. 4 and 5, the advanced analysis and diagnosis section 6 analyzes a changing trend from data on change over time sent from the facility state determining section 3b on the user side B and sends the analysis results to the automatic diagnosis section 6a. Moreover, the advanced analysis and diagnosis section 6 has a trend management section 6c for having the output sent to the automatic diagnosis section 6a transferred to a life prediction section to predict life and a life prediction section 6d for predicting life based on the data on change over time managed by the trend management section 6c, calculating life prediction by a unique formula acquired from past diagnostic performances and sending the analysis results to the automatic diagnosis section 6a provided thereto.

In addition, the advanced analysis and diagnosis section 6 has a thorough diagnosis section 6e for detecting a characteristic frequency from thorough diagnosis information by Fast Fourier transform (FFT) which is a representative frequency analysis technique, comparing it to the thorough diagnosis information of normal time and sending the analysis results to the automatic diagnosis section 6a provided thereto.

In addition, the advanced analysis and diagnosis section 6 has an improvement method selecting section 6f for selecting a most suitable improvement method according to the specifications and diagnostic contents of the facility apparatus 1 from an improvement method database constructed based on the diagnoses and improvements implemented in the past and using the results thereof as diagnostic results of the automatic diagnosis section 6a, and a maintenance information section 6g for managing the specifications, maintenance planning, maintenance performances and so on, performing an automatic analysis based on this information and contributing to concrete countermeasures, improvement methods and so on.

The facility monitoring section 5 on the user side B and the advanced analysis and diagnosis section 6 on the facility diagnosis center side C are connected by the communication network 10 such as a network, the Internet or a public circuit, and various kinds of information such as the facility state detecting information and a diagnostic report mutually exchanged between them is rendered as the electronic file and is sent and received by e-mail and so on.

Reference numeral 9 in FIG. 3 denotes a firewall installed between an external network and an internal network, which is intended to block unauthorized break-in by a malicious third party from the outside and leak, falsification and destruction of the data and so on thereby. Moreover, it may be a configuration without the firewall 9 in the case where security is ensured.

Moreover, a leased line, a communication satellite or the like may be utilized as another communication network 10 for connecting the facility monitoring section 5 on the user side B to the advanced analysis and diagnosis section 6 on the facility diagnosis center side C.

The information sent from the facility monitoring section 5 on the user side B undergoes an advanced analysis in the advanced analysis and diagnosis section 6, and the results thereof are sent back to the facility monitoring section 5 on the user side B, and based on that information, the facility monitoring section 5 notifies the facility apparatus 1 determined to be abnormal of the best action so as to deal with it at once.

As for the facility state detecting means mounted on a large number of facility apparatuses 1, an online apparatus and a portable facility diagnostic measuring apparatus are adopted as standard diagnosis and thorough diagnosis in terms of rotating machine vibration diagnosis, and an oil diagnosing apparatus is adopted in terms of oil diagnosis as shown in FIG. 4 for instance.

Here, the standard diagnosis determines whether the facility is normal or abnormal from a vibration level and the change over time thereof and also briefly determines the cause, part, degree, life prediction and so on thereof, whereas the thorough diagnosis analyzes in detail an event undeterminable by the standard diagnosis by means of a frequency analysis and so on.

In addition, the facility state detecting means in piping management performs a nondestructive inspection by utilizing a UT (Ultra Sonic) or corrosion diagnosis with an infrared camera for instance, and the facility state detecting means in tank bottom plate diagnosis performs the nondestructive inspection of the entire tank bottom plate by utilizing the UT for instance, and the facility state detecting means in a general static apparatus performs the nondestructive inspection by utilizing the UT or the corrosion diagnosis with the infrared camera.

In addition, a daily inspection system shown at the upper right of FIG. 4 implements the information on plant inspection performed daily by an operator by inputting it to a portable terminal on site inspection so as to realize data management on a personal computer, mainly handling process information (temperature and pressure during operation), leak related to the facility and sensory information such abnormal noise.

In addition, although the facility state detectors 2a and 2b comprised of the sensor elements and so on mounted on the facility apparatuses 1 constantly detect various status conditions such as vibration, temperature, pressure, lubricant components, sound, currents and voltage, they may also be portable facility diagnostic measuring apparatuses with which an operating worker measures various kinds of information when making a tour of the facility apparatuses 1 instead of mounting the facility state detectors 2a and 2b directly on the facility apparatuses 1.

For instance, if an example of the case where the facility apparatuses 1 are the rotating apparatuses is described in detail, the facility state detecting information on the rotating apparatuses is sent to the facility management data processing section 3a from the facility state detectors 2a and 2b mounted on the large number of rotating apparatuses.

The facility management data processing section 3a performs signal processes such as the filter process and speed conversion to the signal received as the primary process, and further performs a peak process, a frequency analysis and so on to output (primary process output) a determination signal comprised of an acceleration overall value, an acceleration peak value, a speed overall value and soon necessary to diagnose vibration situation of the rotating apparatuses concerned and sends it to the facility state determining section 3b.

The facility state determining section 3b has a management reference value created in advance on the facility diagnosis center side C inputted thereto, and compares to the above described management reference value the determination signal which is the information outputted from the facility management data processing section 3a so as to determine the level of the rotating apparatuses concerned. Normally, the determined levels are broadly classified into "normal" and "abnormal," and "abnormal" is further divided into "caution" and "danger." The determined determination signal is recorded in the facility monitoring section 5.

In the case where it is determined as "caution" or "danger" indicating being "abnormal" by the facility state determining section 3b, the facility monitoring section 5 records predetermined information such as measurement data and history data of the rotating apparatuses concerned and the measurement data of another rotating apparatus of the same model operating at a different location as well as the determination signal (primary process output result) sent from the facility state determining section 3b, and automatically transmits such information by e-mail to the advanced analysis and diagnosis section 6 after arranging it in the electronic file attached to the e-mail via the communication network 10 such as a network, the Internet or a public circuit. In addition, it automatically transmits the information periodically (once a day for instance) in the case of "normal."

Moreover, it may also be the method of downloading the data from the facility monitoring section 5 by using a monitoring screen in a home page format from the facility diagnosis center side C.

To be more specific, according to this embodiment, the facility monitoring section 5 outputs it by attaching abnormality data in the case of "abnormal" in addition to whether or not there is an abnormality, and sends it to the advanced analysis and diagnosis section 6.

The facility state determining section 3b has a function of checking whether or not the information determined as "abnormal" is a temporary phenomenon due to disturbance, and thus, the information determined as "abnormal" for a cause other than the temporary phenomenon is sent to the advanced analysis and diagnosis section 6.

FIGS. 8 and 9 are the examples of images displayed on the facility monitoring section 5 on the user side B to be sent to the advanced analysis and diagnosis section 6, where FIG. 8 shows a measurement data list related to the rotating apparatuses concerned, and FIG. 9 is a graph showing the change over time of a measurement point of a specific rotating apparatus of the rotating apparatuses concerned.

A determination field 7a shown in FIG. 8 has distinction of normal "○," caution "Δ," and danger "×" recorded therein. In addition, as for the graph of the change over time shown in FIG. 9, a vertical axis shows a vibration value (mm/sec) and a horizontal axis shows a date, and the graph of the change over time shown in FIG. 9 is displayed by clicking on a graph display button 7e after selecting a channel number 7c and a period type 7d of "1" to "32" in a selection field 7b on the screen in FIG. 8.

Only the information on the rotating apparatuses determined as caution "Δ" and danger "×" in the determination field 7a in FIG. 8 is sent from the facility monitoring section 5 to the advanced analysis and diagnosis section 6 to undergo the advanced analysis. If various kinds of information on the rotating apparatuses shown in FIGS. 8 and 9 is sent from the facility monitoring section 5 to the advanced analysis and diagnosis section 6, the advanced analysis and diagnosis section 6 performs the advanced analysis of the information on the rotating apparatuses determined as caution "Δ" and danger "×" indicated in the determination field 7a in FIG. 8.

The advanced analysis and diagnosis section 6 performs the advanced analysis of the information on the rotating apparatuses determined as caution "Δ" and danger "×" which is sent, and extracts and identifies necessary items such as the cause, most appropriate countermeasures and future maintenance planning so as to send them back by e-mail to the facility monitoring section 5 in the plant A on the user side B via the communication network 10 such as a network, the Internet or a public circuit. Moreover, it is also possible to send them by facsimile or deliver them as a document by mail.

To be more specific, the advanced analysis is performed as to the rotating apparatuses having nine measurement points of which channel numbers in FIG. 8 are "10" and "13" to "20," and thereafter, the diagnostic results shown in FIG. 10 are sent back to the facility monitoring section 5 from the advanced analysis and diagnosis section 6.

FIG. 10 is an example of the image of an extruder which is an example of the rotating apparatus sent from the advanced analysis and diagnosis section 6, and if a "✓" mark entered in a primary diagnosis results field 8a is selected and clicked on, the primary diagnosis results with comments of "Cause" and "Countermeasures" in writing as exemplified in FIG. 11 are attached.

As shown in FIG. 11, the diagnosis results are expressed affirmatively to avoid an expression which may confuse the determination on the user side B and are also expressed concretely to allow countermeasures to be immediately taken.

In the case where, in performing the advanced analysis of the information on the rotating apparatuses determined as caution "Δ" and danger "×," the advanced analysis and diagnosis section 6 determines that further precise analyses thereof needs to be performed, it requests the facility monitoring section 5 to extract further necessary information, and additionally analyzes the new information sent from the facility monitoring section 5 so that the same diagnostic results as shown in FIG. 10 are sent back to the facility monitoring section 5 from the advanced analysis and diagnosis section 6.

Although it is not shown in FIG. 10, if the "✓" mark entered in a secondary diagnosis results field 8b as with the primary diagnosis results field 8a is selected and clicked on, the secondary diagnosis results with comments of "Instruction" and "Determination" in writing as exemplified in FIG. 12 are attached.

As the facility monitoring section 5 on the user side B and the advanced analysis and diagnosis section 6 on the facility diagnosis center side C are connected by the communication network 10 such as a network, the Internet or a public circuit to allow bi-directional communication, the user side B can seek satisfactory explanation on the diagnosis results of the rotating apparatuses from the facility diagnosis center side C by e-mail, telephone and so on.

Next, the configuration of the advanced analysis and diagnosis section 6 will be described in detail. The advanced analysis and diagnosis section 6 has recorded and accumulated therein facility apparatus specification information on various apparatuses and parts constituting each of various facility apparatuses 1 such as standards and dimensions, manufacturer, date of manufacture, and various specification items (number of revolutions, axis diameter, working temperature and so on, for instance), maintenance history information such as date of installation, operation records and repair records, and measured value history information acquired so far by inspecting and diagnosing the facility apparatus land soon as to each of various facility apparatuses 1 in many fields placed in the plant A.

Furthermore, it has various facility apparatuses 1 classified according to size, loaded condition, installation environment and soon thereof, and has systematically arranged, recorded and accumulated therein the data wherein a vibration state, remaining life and so on of the facility apparatus under optimum operating conditions are statistically and theoretically calculated as well as the causes of the abnormalities as to abnormal phenomena which occurred in the past and the countermeasures comparing with them and so on.

For instance, in the case where the advanced analysis and diagnosis section 6 diagnoses the vibration state of a predetermined rotating apparatus, the advanced analysis and diagnosis section 6 has already inputted therein various kinds of information such as the number of revolutions, axis diameter, loaded condition, lubricated condition and installed condition on population of the rotating apparatuses of the filed to which the rotating apparatus belongs to, so that it can grasp a pertinent vibration state of the population of the rotating apparatus.

And it is possible to determine the level of the vibration state of the predetermined rotating apparatus by adopting these pertinent numerical values as the management reference values and comparing them to the measured values of the vibration state of the predetermined rotating apparatus.

As for the management reference values to be the criteria, for instance, the rolling bearing abnormal vibration determination criteria shown in FIG. 15 have a horizontal axis which is a DN value (axis diameter×number of revolutions) and a vertical axis which is a vibration acceleration value, and if the DN value of the facility is known, there can be found, from that position upward in the vertical axis direction, the graphs of normal, caution, danger and so on which are respective management thresholds. The criteria were created by arranging and constructing the diagnostic performance data.

Furthermore, it is possible to grasp the cause of the abnormality (structural abnormal condition, bearing abnormal condition and so on for instance) of the predetermined rotating apparatus by accumulating the maintenance history information and measured value history information on the population of the rotating apparatuses, and in that case, it is feasible to present the best countermeasures as to what action should be taken (an improvement method database 6/1 in FIG. 5).

Likewise, it is possible to predict how long the current state continues and what state it thereby develops to, that is, to analogize the remaining life of the predetermined rotating apparatus (remaining life determination database 6d1 in FIG. 5).

These can be statistically and theoretically calculated based on the facility apparatus specification information, maintenance history information and measured value history information and so on on the rotating apparatuses accumulated in the advanced analysis and diagnosis section 6.

If it is generally assumed that the facility apparatuses 1 manufactured with the same material and the same specifications are operated under the same conditions, the facility apparatuses 1 have the identical history as a matter of course. However, it is almost impossible in reality that the facility apparatuses 1 are exactly the same, and so causal relationship of the facility apparatuses 1 determined as "abnormal" is very wide-ranging and complicated.

Therefore, it is possible to classify a large amount of data obtained from the actual facility apparatuses 1 according to size, loaded condition, installation environment and so on thereof based on destructive physics and statistical theory and systematically arrange and accumulate the information to compare the data showing the current state of the subject facility apparatus 1 to the above described accumulated information on the population so as to diagnose the current facility state of the subject facility apparatus 1 (automatic diagnosis section 6a).

Furthermore, it is possible to analogize how long the facility apparatus 1 continues the current state and what state it thereby develops to, or in the case where it develops to an abnormal state, what countermeasures should be taken to block it, so that effective planning maintenance measures can be constructed as a result (life prediction section 6d, improvement method selecting section 6f).

To be more specific, the advanced analysis and diagnosis section 6 has all the information and data on various facility apparatuses 1 placed in a number of the plants A recorded and accumulated therein, and it is thus possible to construct planning maintenance of various facility apparatuses 1, not to mention the facility diagnosis thereof, by composing a theoretical formula to allow calculation of a general trend on the basis of the information and data and improving precision of the theoretical formula while comparing the results of the formula and the actual state of the facility apparatuses 1 and correcting coefficients thereof one after another in the meantime.

Next, a concrete example of leading to the diagnostic results of the facility apparatuses 1 in the advanced analysis and diagnosis section 6 will be described by using FIG. 13. FIG. 13 shows a part of a diagnostic knowledge matrix table stored in the advanced analysis and diagnosis section 6 in order to lead to the diagnostic results of a predetermined air blower proper. As a matter of course, the configuration of the diagnostic knowledge matrix table is classified according to the model constituting each facility apparatus 1 (a fan or a compressors for instance), and so each table is different.

The horizontal axis of the diagnostic knowledge matrix table shown in FIG. 13 has the abnormal phenomena which may occur classified into a large number of items, and the vertical axis is comprised of many items such as the time of abnormality occurrence, point of abnormality occurrence, abnormality mode, change of abnormality over time and parts lineup of the facility apparatus 1, where the items concerned are marked with "●." These are not only marked in terms of statistics and experience, but are also marked based on the above-mentioned theoretical calculation. And as mentioned above, if the information on the predetermined air blower proper is sent from the facility monitoring section 5 to the advanced analysis and diagnosis section 6, the items of the vertical axis in the diagnostic knowledge matrix table in FIG. 13 are automatically marked.

And as a result of the marking, the diagnostic knowledge matrix table as the population of the air blower proper already constructed in the advanced analysis and diagnosis section 6 is compared, contrasted and calculated with the information on the above described predetermined air blower proper so as to lead to the diagnostic results of the predetermined air blower proper which are the same as those shown in FIG. 10.

Furthermore, knowledge in writing in which the cause of occurrence, countermeasures, maintenance planning and so on are written is constructed to work with the diagnostic knowledge matrix table as to each of the large number of abnormal phenomena constituting the diagnostic knowledge matrix table which may occur, and so the diagnostic results as the same comments on the predetermined air blower proper as shown in FIGS. 11 and 12 are automatically composed and synthesized by the knowledge in writing by comparing, contrasting and calculating the information on the predetermined air blower proper with the diagnostic knowledge matrix table.

However, the above configuration can only perform the signal processing prepared in advance in the facility management data processing section 3a, and so it can only use the facility state parameters which are processing results thereof. In addition, in the case where there is an effective signal process (facility state parameter) as to a certain phenomenon, it is necessary to incorporate that function into the facility management data processing section 3a placed on the user side B each time, so that a problem of burdensome maintenance and updating occurs. Moreover, it is possible to incorporate all the presumed signal processes into the facility management data processing section 3a in advance, yet it is not efficient but uneconomical to incorporate all the functions of low frequency of use.

Thus, according to this embodiment, it is possible to process output signals of the facility state detectors 2a and 2b in the facility management data processing section 3a, and furthermore, in the case where it is necessary to lead raw waveforms of the output signals of the facility state detectors 2a and 2b to the facility state determining section 3b by performing various advanced processes rather than immediately determining them in the facility state determining section 3b, to be equipped with a facility management data analysis program necessary for the advanced analytic processes in the advanced data analysis section 6b, upload the facility management data analysis program to the user side B by a remote process from the facility diagnosis center side C, process the output signals of the facility state detectors 2a and 2b to be processed on the user side B via the communication network 10 such as a network, the Internet or a public circuit, and send back the processing results to the facility diagnosis center side C so as to alleviate a transmission load on the communication network 10 and also solve the above-mentioned problems To be more specific, in the case where the advanced analysis and diagnosis section 6 determines that the advanced analysis is necessary from another viewpoint, an instruction to generate a secondary process program is sent from the automatic diagnosis section 6a to the advanced data analysis section 6b, and the necessary facility management data analysis program is selected and extracted as appropriate from the facility management data analysis program group 12 so that each facility management data analysis program for the secondary process is generated as the electronic file as shown in FIGS. 6 and 7.

FIGS. 6 and 7 show examples of the case where the FFT file 11c is created from the signal processing recipe. In the case of performing the advanced analysis by the Fast Fourier transform (FFT) which is a representative frequency analysis technique, the averaging process is performed first, and then a waveform cutout process is performed by a time window, and the analytic process is performed thereafter.

The facility management data analysis program group 12 has programs grouped according to various functions such as various averaging process programs 12a including a time average process (Average), RMS (Root Mean Square) and so on, various time windows programs 12b including hanning window, hamming window and so on, and various analytic process programs 12c including the Fourier transform, wavelets and so on, and further has requirements for various programs to operate, output forms of the programs and so on stored therein.

The facility management data analysis program group 12 has an object (a small program having each function) integrating the data itself and the process for handling the data, and the advanced data analysis section 6b instructed by the automatic diagnosis section 6a to generate the secondary process program selects and combines the best suited objects based on the contents of a signal processing recipe 11 so as to automatically generate the secondary process program. In addition, each object performs the process it has, updates and refers to the data, and further exchanges messages with the objects having other functions and thereby performs collaboration among the objects.

Exchange among the objects can be dispersively processed because of a mechanism in which the objects themselves do not need to mutually know where the other object exists. Thus, it is possible, by rendering the signal processes as the objects and uniting the objects according to the purposes, to implement the environment for fitly uploading necessary analytic processes to the user side B.

The averaging process is the process implemented for the sake of, as to a distorted waveform of which periodic vibration of a period T includes a harmonic in addition to a basic waveform and a random waveform comprised of frequency components of a plurality of periods, representing an amplitude level of these waveforms. And the time average process (Average) and RMS (square roots of distribution) are indicated by the following formula 1 respectively.

Formula 1

$$\left.\begin{array}{l} \text{Average (time average process)} \\ \overline{x} = \lim_{\Delta T \to \infty} \frac{1}{T} \int_0^T x(t)\,dt \\ \text{RMS(Root Mean Square)} \\ x_{rms} = \sqrt{\lim_{T \to \infty} \frac{1}{T} \int_0^T x(t)^2\,dt} \end{array}\right\} \quad (1)$$

In addition, as for periodicity when performing digital Fourier transform, a joining portion of the waveforms is problematic. For instance, when analyzing a spectrum of a certain waveform, a high frequency component generated from the joining portion of the periods is analyzed together, and this high frequency is not the component existing in the original waveform so that, if the waveform of a finite section of an analysis subject is multiplied by a function of which both ends are gently attenuated and then digital Fourier transform is performed thereto, the spectrum having eliminated the high frequency generated from the joining portion can be observed. The function of which both ends are gently attenuated for waveform cutout to be utilized for such a purpose is called time windows.

There are various time windows devised, which are creatively used according to differences in analysis purposes and qualities of the waveforms respectively. As for the time windows, representative ones are the hamming window (suited to the analysis of those having close frequency components) and the hanning window, (suited to the analysis of those having not so close frequency components).

The Fourier transform is a representative frequency analysis for converting a complicated signal into an aggregate of a large number of sine wave groups, and the wavelet is a time-frequency analysis for arbitrarily decomposing the raw waveform signal into wavelets.

And on receiving the instruction to generate the secondary process program from the automatic diagnosis section 6a, the advanced data analysis section 6b selects and combines the best suited programs of various kinds from the facility management data analysis program group 12.

In the case where the FFT is selected as the secondary process for instance, to generate the FFT file 11c, the time average process (Average) is selected from an averaging process program 12a according to the form of fluctuation and frequency band of the subject signal, the hamming window is selected from a time windows program 12b, the Fourier transform is selected from the analytic process programs 12c, and furthermore, related definitions, connections, requirements for various programs to operate, output forms of the programs and so on are conformed so as to generate the secondary process program and render it as the electronic file (11c').

The electronic file 11c' having the facility management data analysis program to be the secondary process program generated by the advanced data analysis section 6b on the facility diagnosis center side C stored therein is uploaded to the facility monitoring section 5 on the user side B via the communication network 10 as shown in FIG. 2, and furthermore, the facility monitoring section 5 sends the predetermined facility management data analysis program from the uploaded electronic file 11c' to the facility management data processing section 3a.

In the facility management data processing section 3a, the facility state detecting information detected by the facility state detectors 2a and 2b to be the facility state detecting means is signal-processed and outputted by the predetermined facility management data analysis program which was sent, the information outputted from the facility management data processing section 3a is level-determined comparing with the management reference value and outputted by the facility state determining section 3b, and the information related to the facility apparatuses 1 level-determined and outputted by the facility state determining section 3b is gathered and processed by the facility monitoring section 5 to be outputted to the advanced analysis and diagnosis section 6 on the facility diagnosis center side C via the communication network 10.

FIG. 14 shows an example of output of program processing results on the user side B in the case where the secondary process (advanced analysis) is performed by the facility management data analysis program of the FFT uploaded to the user side B in the facility management data processing section 3a as to the measurement point of the channel number "13" in FIG. 8. Moreover, as for the analysis results shown in FIG. 14, the same contents are sent to the facility diagnosis center side C via the communication network 10, and further undergo the advanced analysis in the advanced analysis and diagnosis section 6 on the facility diagnosis center side C.

And the advanced analysis and diagnosis section 6 having received the information outputted from the facility monitoring section 5 further performs the advanced analysis and identifies the cause of the abnormality of the facility apparatus 1 concerned and improvement measures thereof to send the identified results to the facility monitoring section 5 via the communication network 10, and further uploads the facility management data analysis program as required to the facility monitoring section 5 again, which steps are repeatedly performed.

In addition, the facility monitoring section 5 gathers and processes at least one of maintenance information, operation information and external information from at least one of a maintenance information data base 13 to be a maintenance information section, an operation information database 14 to be an operation information section and an unshown external information database to be an external information section of the facility apparatuses 1 shown in FIG. 2 so as to output it to the advanced analysis and diagnosis section 6 on the facility diagnosis center side C.

To be more specific, in addition to the signal processing, the contents of the secondary process include the maintenance information database 13 having the information such as the maintenance planning, facility specifications and maintenance history in the user side B stored therein, the operation information database 14 having the information such as process information, production planning and quality information stored therein, and the process of gathering the external information such as design specifications and product information of manufacturers and outputting it to the advanced analysis and diagnosis section 6 on the facility diagnosis center side C.

INDUSTRIAL APPLICABILITY

1. As the present invention has the above-mentioned configuration and action, a person in charge of the work in the plant on the user side grasps and manages operating situation of the facility apparatuses to gather various kinds of data on a routine basis, and if the information falling under a level of abnormality is extracted from the gathered information, the information is promptly sent to the facility diagnosis center side which is the specialized technological group via the communication network 10 such as a network, the Internet or a public circuit, and on the facility diagnosis center side, the advanced analysis and diagnosis section can perform the advanced analysis of the information and promptly send back to the user side the best information on the facility apparatus determined to be abnormal, so that the user side can promptly take the measures instructed by the specialized technological group based on it.

In addition, the management of facility apparatuses performed based on personal knowledge and judgment of the person in charge of the work in the past is entrusted to the facility diagnosis center side constituted by technically trained personnel having the expertise so that it is no longer necessary to station the technically trained personnel at each individual plant on the user side, and it is thus possible to improve safety and productivity of the facility apparatuses on the user side and also realize improvement in accuracy of the facility apparatus management, increased efficiency of personnel, and reduced total costs of the plants in addition.

In addition, in the case where the advanced analysis and diagnosis section determines that diagnostic accuracy will be improved by performing the advanced analysis again, it further uploads the facility management data analysis program, as the secondary process, from the advanced analysis and diagnosis section on the facility diagnosis center side to the facility monitoring section on the user side via the communication network so that the advanced analysis is performed again on the user side.

The facility management data analysis program is uploaded to the user side and the advanced analysis is performed on the user side again, and thus it is no longer necessary to send to the facility diagnosis center side the raw data of an enormous information amount such as the facility state detecting information detected by the facility state detecting means and only a small information amount solely of the analysis results is sent to the facility diagnosis center side so that the burden of information transfer on the communication network is alleviated.

In addition, security of the information is improved because the raw data is not exchanged on the communication network.

The invention claimed is:

1. A facility apparatus managing apparatus comprising:
   facility management data processing means for signal-processing and outputting facility state detecting information detected by facility state detecting means mounted on a facility apparatus for detecting a state of the facility apparatus;
   facility state determining means for determining a level of information outputted from said facility management data processing means comparing with a management reference value and outputting it; and
   facility monitoring means for gathering and processing the information related to the facility apparatus level-determined and outputted from said facility state determining means and outputting it to an external apparatus having a function of diagnosing the facility apparatus, wherein said facility monitoring means carries out mutual communication with said external apparatus via a communication network, and downloads a facility management data analysis program from said external apparatus.

2. The facility apparatus managing apparatus according to claim 1, wherein said facility monitoring means downloads a predetermined facility management data analysis program rendered as an electronic file from said external apparatus, and sends the predetermined facility management data analysis program from the electronic file to said facility management data processing means, and the facility management data processing means signal-processes and outputs the facility state detecting information detected by said facility state detecting means by means of said predetermined facility management data analysis program.

3. The facility apparatus managing apparatus according to claim 1 or 2, wherein said facility monitoring means gathers, processes and outputs at least one of maintenance information, operation information and external information from at least one of a maintenance information means, an operation information means and an external information means of said facility apparatus.

4. The facility apparatus managing apparatus according to claim 1, which repeats the steps in which said facility monitoring means downloads the facility management data analysis program from said external apparatus, said facility management data processing means signal-processes and outputs the facility state detecting information detected by said facility state detecting means by using the downloaded facility management data analysis program, said facility monitoring means gathers, processes and outputs the information outputted from the facility management data processing means, and said facility monitoring means receives the results of a predetermined process performed to the information outputted from said facility monitoring means by said external apparatus and the facility monitoring means downloads the facility management data analysis program.

5. The facility apparatus managing apparatus according to claim 1 or 2, wherein said facility monitoring means and said external apparatus are connected by a network, the Internet or a public circuit.

6. The facility apparatus managing apparatus according to claim 1 or 2, wherein said facility monitoring means produces output by attaching abnormality data in the case of abnormality in addition to whether or not there is an abnormality.

* * * * *